United States Patent

Roberts et al.

[15] 3,638,590
[45] Feb. 1, 1972

[54] WASTEWATER TREATMENT SYSTEM

[72] Inventors: William F. Roberts; Edmund L. Kaminsky, both of 150 Strafford Road, Wayne, Pa. 19087

[22] Filed: Sept. 18, 1970

[21] Appl. No.: 73,510

[52] U.S. Cl. ................................................110/7, 210/67
[51] Int. Cl. ..............................................F23b 1/28
[58] Field of Search......................110/7 R, 7 S, 8 R; 210/67, 210/71, 175, 252

[56] References Cited

UNITED STATES PATENTS

| 3,226,317 | 12/1965 | Albertson | 210/67 X |
| 3,457,881 | 7/1969 | Test et al. | 110/7 |

*Primary Examiner*—John J. Camby
*Attorney*—Littlepage, Quaintance, Wray & Aisenberg

[57] ABSTRACT

In a shipboard system, wastewater is withdrawn from a storage tank and is comminuted to reduce the size of waste solids. Coagulant is added, and the wastewater is centrifuged. Solid wastes are incinerated. The liquid wastes are disinfected and dissolved organic material is adsorbed in activated carbon. An effluent of tertiary quality is discharged.

16 Claims, 1 Drawing Figure

PATENTED FEB 1 1972
3,638,590
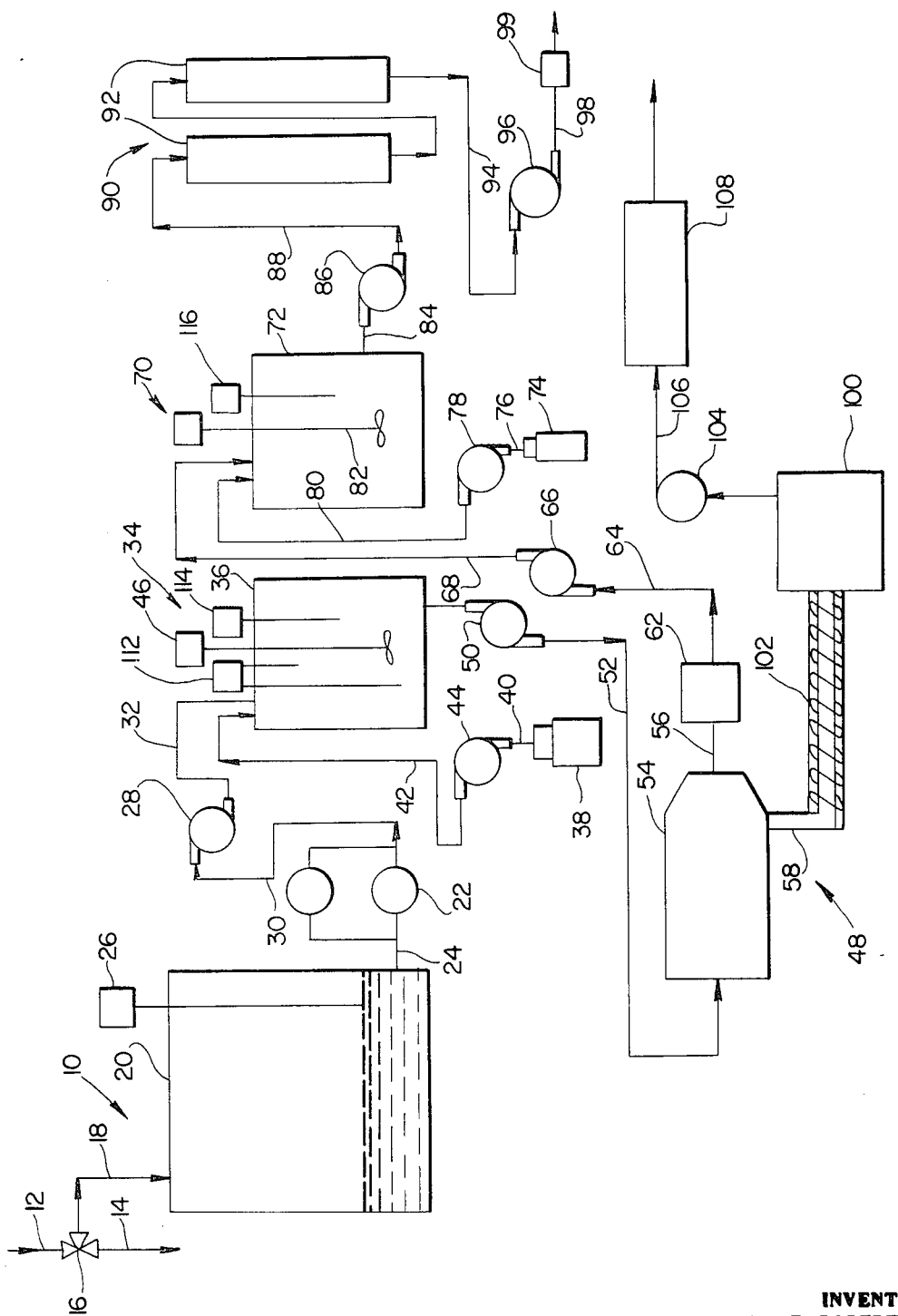
INVENTORS
WILLIAM F. ROBERTS
EDMUND L. KAMINSKY
*Littlepage, Quaintance, Wray & Aisenberg*
ATTORNEYS

WASTEWATER TREATMENT SYSTEM

BACKGROUND OF THE INVENTION

For small self-contained disposal systems such as used onboard ships, sources of waste fluids include raw sewage and waste water from showers, laundries, dishwashers and galley equipment. Flushing water may be fresh or salt.

Waste generally consists of solid wastes suspended in the liquid and dissolved organic solids. Some of the fluids, particularly raw sewage, are high in BOD and coliform bacteria and other potential ecological pollutants.

In earlier times, it was common practice to discharge waste fluids over the side of a vessel. Unfortunately this method of disposal has persisted to the present day. Heads aboard yachts and other pleasure craft normally discharge untreated human excrement to the sea. Greater quantities of waste fluids generated aboard larger vessels, such as cargo and passenger liners, have received the same untreated disposal.

As an alternative to discharge at sea, waste fluids may be stored onboard until proper disposal means can be provided. For example, waste fluids can be collected and stored in tanks and subsequently discharged ashore to a conventional sewer for treatment. While perhaps acceptable for small waste accumulations, this solution is not acceptable for large vessels where the quantities of waste fluids are large, or where the vessels remain at sea for extended periods.

Other alternatives to simple discharge or storage include chemical treatment. However, chemicals may only be effective on the surface of solid wastes and may not permeate interior regions. Thus, some pollutants may escape chemical treatment to further challenge our ecological balance. Discharging of even fully treated solids is unacceptable in coastal and inland waters.

The adequacy of the aforementioned methods of waste fluid disposal has recently received Congressional action by passage of the Water Quality Improvement Act which prescribes maximum discharge levels of ecological pollutants.

SUMMARY OF THE INVENTION

The apparatus provides improved means for treating waste fluids while the specific embodiment illustrated by the drawing is designed for a marine application, it should be clearly understood that the form and spirit of the invention may be applied to any situation in which it is desired to treat waste.

The apparatus has receiving means for communicant with a source of waste fluid. The waste fluid typically comprises raw sewage, waste water from showers, sinks and latrines and laundry facilities. Additionally, garbage from the galley may be ground and added to the waste fluid as an alternative to dumping it over the side.

In one embodiment, the receiving means is simply a pipe connected to the several sources of waste fluids. In a preferred embodiment, a three-way valve is disposed in an inlet pipe. The valve selectively permits waste fluid to enter the treatment apparatus or directs the waste to flow to another location. When moored at a pier, waste water from a ship may be directed to a conventional on shore sewer system for disposal.

The inlet pipe directs waste fluid to storage means, such as a collection tank.

Propulsion means withdraws waste fluid from the storage means and propels the waste through the apparatus. In a preferred embodiment, the propulsion means has a series of fluid transfer pumps located at specific points in the system for controlling the flow and treatment of fluids processed by the apparatus.

A quantity of waste fluid is withdrawn from the storage means and is supplied to comminution means, typically a mechanical macerator. In one preferred embodiment, two comminutors are arranged in parallel to facilitate maintenance and to insure no interruption of service in the event of a comminutor malfunction. This arrangement improves the reliability of the system. Typically, the comminutors reduce the size of waste solids to maximums of one-quarter inch.

Waste fluid is directed from the comminutors to coagulation means. In one form, the coagulation means has a coagulation tank, a coagulant, or flocculant, and coagulant supply means communicant a source of the coagulant and connected to the coagulation tank for supplying coagulant to the tank. In preferred forms, coagulant is pumped into the tank and coagulant mixing means, such as a mechanical mixer, insures the mixing of the coagulant with comminuted waste fluid. Typically, the coagulant is a water-soluble organic polymer of high molecular weight of natural or synthetic origin known in the trade as polyelectrolytes typified by Hercofloc 818, a product of Hercules, Inc. The coagulation destabilizes the colloidal particles so that they will coagulate and be separated.

Coagulant may be added directly to the centrifuge before liquid is removed. Preferably in that case the coagulant is added in a second stage of the centrifuge after the gross solids have been removed. Thus the coagulant use is economized by having the coagulant operate only on solids which remain suspended, particularly colloids within the liquid. Together the coagulating and separating apparatus are collectively referred to as coagulating and separating means, whether the coagulant is added in a tank or in the centrifuge.

When systems have heavy grease load, degreaser for example, finely divided carbon may be added before the separation stage to precipitate the grease in the waste. The degreaser step is particularly useful when separation is accomplished by centrifuging. Pressure filters separation usually removes substantial portions of grease from the liquid.

The liquid and solids are directed from the coagulation means to separation means. In a preferred embodiment, the separation means is a centrifuge, specifically a scroll-discharge centrifugal settler. In other embodiments, the separation means may comprise pressure filters.

Solid wastes, typically in a cakelike composition, are directed from the separation means to solid disposal means, such as an incinerator, where the solids are burned to a sterile ash. In one embodiment, a motor-driven screw conveyor or a solids handling pump is used to deliver the caked solids to the incineration means. The temperature in the incinerator is typically between 1,000° F. and 1,400° F. In a preferred embodiment, afterburner means, such as air electrical afterburner, is connected to the incineration means for completing combustion of the gases of combustion and for reducing the level of offensive odors. The incinerator and afterburner may be electrically heated or ships fuel may be burned in either or both.

Solids may be held in tanks for transfer to disposal systems ashore as alternative to incineration.

Liquid wastes are directed from the separation means to liquid disposal means. In one preferred form, the liquid disposal means has disinfection means and adsorption means. The disinfection means has a disinfection tank, a disinfectant, and disinfectant supply means communicant with a source of disinfectant and connected to the tank for supplying disinfectant thereto. The disinfectant is typically sodium hypochlorite. However, it should be clearly understood that any other well-known disinfectant capable of killing coliform bacteria may be used. In addition to killing the coliform bacteria, the disinfectant also destroys viruses and amoebic cysts in the waste liquid. Disinfectant mixing means, such as a mechanical mixer insure adequate mixing and disinfection of the waste liquid. In a preferred embodiment a disinfection tank is kept half full, with a discharge slower that a fill speed calculated according to batch volume.

Disinfected waste liquids are directed from the disinfection means to adsorption means. In one embodiment, the adsorption means has a series of granular activated carbon columns. Dissolved organics are adsorbed by the pore surfaces of the activated carbon. The columns are arranged in series to take advantage of the adsorption gradient. Most of the adsorption occurs in the first column, with each successive column being subjected to less of the dissolved organic loading. The adsorptive capacity of the first column will be exhausted first, and only one column needs to be replaced at one time. The new column is hydraulically connected to the remaining columns in such a fashion that it becomes the last one in series, with the original second column becoming the first column.

In one preferred embodiment, 94 percent of waste solids are removed in the centrifuge. Thus, clogging of the columns is inhibited and the adsorptive capacity of the columns is preserved.

As activated carbon more readily adsorbs nonpolar molecules, as the dissolved organics, polar molecules such as the dissolved salts in salt water will not adversely affect the columns.

Expended or spent carbon columns are handled in several ways. In one embodiment, spent columns are drained into the storage tank, and the carbon with the dissolved organics is burned in the incinerator. In another method, the spent columns drained or full are stored in sealed containers aboard ship for subsequent regeneration on land. Since the waste liquid has been disinfected before entering the carbon columns, the columns can be handled with no danger of infection to personnel.

Effluent fluid, of tertiary quality, is directed to outlet means for further disposal, such as by overboard draining. In one embodiment, the treated effluent fluid is discharged to the sea. In another embodiment, the effluent is recycled as flushing water to commodes. Additional disinfection of the waste water after passage through the adsorption means may also be employed.

One object of the invention is to provide efficient means for treating fluid waste in such a way as to preserve the ecological balance of our environment.

Another object is to provide a compact means for treating waste fluids.

Still another object is to provide means for treating an influent in such a way as to generate an effluent in which the suspended solids do not exceed 50 milligrams per liter, the BOD does not exceed 50 milligrams per liter, and the coliform bacteria count does not exceed a most probable number of 240 MPN per 100 milliliters.

These and other objects will be apparent from the ongoing and foregoing specification which includes the claims, and the accompanying drawings.

BRIEF DESCRIPTION OF THE DRAWING

The drawing is a schematic view of one preferred embodiment of the waste treatment apparatus.

DETAILED DESCRIPTION OF THE DRAWING

In the schematic view of the sewage treatment apparatus, waste receiving means generally indicated by the numeral 10 permits waste to enter the treatment apparatus. In the present case the receiving means includes inlet pipe 12, valve 16, pipe 18 and storage tank 20.

Inlet pipe 12 is connected to a source of raw sewage, and directs the sewage to three-way control valve 16. Valve 16 may be aligned to direct a flow of waste to discharge pipe 14 for permitting direct sewage disposal by other means. Valve 16 may be aligned to direct a flow of waste fluid through pipe 18 into storage tank 20.

Comminutor 22 receives waste from tank 20 through pipe 24, when level control 26 indicates a need for batch processing. Transfer pump 28 draws comminuted waste from comminutor 22 through pipe 30 and propels it to coagulation means through pipe 32.

Coagulation means, generally indicated at 34, includes coagulation tank 36. Pipe 32 delivers comminuted waste to the coagulation tank. Coagulant supply means has a coagulant 38, typically a polyelectrolyte, and coagulant supply lines 40 and 42 for delivering coagulant to tank 36. Coagulant pump 44 is connected to the coagulation supply means between pipes 40 and 42 for drawing coagulant through pipe 40 and propelling it through pipe 42 to tank 36. Mixer 46 is connected to tank 36 for mechanically mixing coagulant with comminuted waste therein. The coagulation means coagulates solids in the waste.

The coagulation means is connected to separation means, shown generally at 48, by pump 50 and line 52 for drawing coagulated waste from the coagulation tank 36 and for delivering waste to the separation means 54.

The separation means is a centrifuge, such as a scroll-discharge centrifugal settler 54, for separating liquids from coagulated solids in the waste. Liquids are removed from the centrifuge through pipe 56; solids are removed through pipe 58.

Liquids disposal means are connected to the centrifuge through pipe 56. Separated liquids are delivered through pipe 56 to surge tank 62. Liquids are drawn from the surge tank through pipe 64 by pump 66 and propelled through pipe 68 to disinfection means, generally indicated at 70.

The disinfection means has disinfection tank 72 for receiving liquid from pipe 68. Disinfectant is drawn from a source of disinfectant 74 through pipe 76 by pump 78 and propelled through pipe 80 into the disinfection tank. Mechanical mixer 82 is mounted in the disinfection tank for mixing disinfectant with waste liquids therein.

Disinfected waste fluid is drawn from the disinfection means through pipe 84 by pump 86 and propelled through pipe 88 to adsorption means, generally indicated at 90.

The adsorption means has a number of adsorption columns 92, connected in series, typically of granular activated carbon, for creating an adsorptive gradient. The columns primarily adsorb disinfected organic material in waste liquid.

Waste liquid is drawn from the adsorptive columns through pipe 94 by pump 96 and is discharged through pipe 98. As shown in the drawing, pipe 98 discharges waste fluid to the environment after the steps of disinfection and adsorption of dissolved organic material.

Solid wastes are removed from the centrifuge through pipe 58. Pipe 58 directs waste solids to incineration means, such as incinerator 100. Pipe 58 also has screw conveyor 102 for mechanically moving waste solids therein. Solids delivered to incinerator 100 are incinerated for reduction to sterile ash. Incineration gases are drawn from the incinerator by exhaust blower 104 and propelled through pipe 106 to afterburner 108. The afterburner is electrically operated and insures complete combustion of incineration gases for preventing air pollution and for preventing escape of offensive odors.

That point of the waste solids that are not converted to gaseous products remain as sterile ash. The ash is periodically removed from the bottom of the incineration means for ultimate disposal.

The apparatus illustrated in the drawing is designed to treat batch lots of waste. Level probe 26 is mounted in collecting tank 20 for sensing the presence of a quantity of waste water in the collecting tank. Level probe 112 is mounted in coagulant tank 36 for sensing the presence of liquid in the tank.

When probe 112 is exposed a system checks probe 26 to insure that the probe senses liquid, which indicates that a predetermined batch quantity is available in the collecting tank.

Comminutor 22 starts, and pump 28 transfers a batch quantity to comminuting tank 36. When probe 112 senses a high level of liquid in the tank, comminutor 22 and pump 28 are shut off. Either probe 114 or probe 112 causes coagulant metering pump 44 to turn on, drawing coagulant from carboy 38.

After a contact time of about 10 minutes, a controller starts the motor for feed pump 50 which pumps the coagulated waste water to centrifuge 54, which may run continuously. At the same time that pump 50 is started, pump 66 is started to transfer fluid from surge tank 62 to chlorination tank 72 of the purification means.

Tank 72 is always approximately half full of chlorinated liquid. As liquid covers probe 116, pump 86 is started. Pump 86 discharges tank 72 at about half the rate that pump 86 fills the tank. When the pumps are operating, metering pump 78 runs, supplying the disinfectant to tank 72. When probe 116 is uncovered, pump 86 and concurrently running pump 96 stop. Metering device 99 checks the quantity of the effluent, and its quality.

While the invention has been particularly shown and described with reference to a preferred embodiment thereof, it will be understood by those skilled in the art that various changes in form and details may be made therein without departing from the spirit and scope of the invention.

What is claimed is:

1. Waste water treatment apparatus comprising:
   receiving means connected to a source of waste water,
   a comminutor connected to the receiving means for comminuting solid material from the receiving means,
   coagulating and separating means connected to the comminutor for receiving comminuted material therefrom, and for separating suspended solids from liquid,
   solids removal means connected to the coagulating and separating means for removing solids from the coagulating and separating means,
   purification means connected to the coagulating and separating means for receiving liquid therefrom, for disinfecting the liquid, and for removing dissolved organics from the liquid, and,
   liquid discharge means connected to the purification means for discharging liquid therefrom.

2. Apparatus of claim 1 wherein the receiving means comprises a collecting tank connected to the source of waste water, for receiving waste water therefrom, and for storing waste water before transfer to the comminutor.

3. Apparatus of claim 1 wherein the coagulating and separating means comprises a centrifuge connected to the receiving means for receiving waste water therefrom and for centrifugally separating solids from liquid in the waste water.

4. Apparatus of claim 3 wherein the coagulating and separating means further comprises a coagulant source connected to the centrifuge for supplying coagulant thereto.

5. Apparatus of claim 1 wherein the coagulating and separating means comprises a coagulant tank connected to the comminutor, a source of coagulant connected to the tank and a separator connected to the tank for receiving coagulated waste water therefrom.

6. Apparatus of claim 5 wherein the separator comprises a pressure filter connected to the coagulant tank.

7. Apparatus of claim 5 wherein the separator comprises a centrifuge.

8. Waste water treatment apparatus of claim 1 wherein the solids removal means comprises incineration means for incinerating solids, and solids transfer means connected to the coagulating and separating means for receiving solids therefrom and connected to the incineration means for delivering solids thereto.

9. Apparatus of claim 8 wherein the solids transfer means comprises a screw conveyor mounted between the separation means and the incineration means.

10. Apparatus of claim 8 wherein the solids transfer means comprises a solids pump.

11. Sewage treatment apparatus of claim 8 wherein the solids removal means further comprises combustion gas exhaust means connected to the incineration means and afterburner means connected to the exhaust means for completing combustion of gases generated in the incineration means.

12. Apparatus of claim 1 wherein the purification means comprises a disinfection tank connected to the coagulating and separating means for receiving liquid therefrom, a disinfectant source, and disinfectant supply means communicant with the source of disinfectant and connected to the disinfection tank for supplying disinfectant thereto.

13. Apparatus of claim 12 wherein the purification means further comprises activated carbon columns connected to the disinfection tank for receiving liquid therefrom, and for adsorbing disinfected dissolved organic material from the liquid.

14. The method of treating waste water which includes mixed solids and liquid comprising the steps of:
   mechanically reducing the size of said solids in said waste water,
   coagulating colloidal solids in the waste water, and mechanically separating said solids from said liquid,
   removing said solids, and
   purifying said liquid material by disinfecting the liquid and adsorbing dissolved organics.

15. The method of shipboard waste water treatment comprising:
   receiving raw waste water
   comminuting the waste water to reduce the size of solid materials therein,
   coagulating and mechanically separating suspended solids from the raw waste water,
   removing separated solids,
   purifying liquid from which suspended solids have been separated by disinfecting the liquid and removing dissolved organics in the liquid by adsorption, and
   discharging the purified liquid.

16. The method of treating waste water which includes solid material and liquid comprising receiving said waste water in a collecting tank, pumping said waste water to a comminutor and comminuting the solid material and discharging the waste water and comminuted material into a coagulating tank adding a coagulant to said coagulating tank to coagulate said solid material, pumping the waste water with coagulated material to a centrifuge separator, centrifuging the waste water to separate the solid material and liquid, pumping said liquid to a disinfectant tank, adding a disinfectant to disinfect said liquid, pumping said disinfected liquid through activated charcoal columns to purify said liquid, and discharging said liquid, conveying said solid material from said separator to an incinerator and burning said solid material.

* * * * *